United States Patent [19]
Gebelius

[11] 3,942,240
[45] Mar. 9, 1976

[54] METHOD FOR THE ATTACHMENT OF TUBULAR PIPE CONNECTION MEANS TO A SHEET METAL WALL AND A DEVICE ACCORDING TO THE METHOD

[76] Inventor: Sven Runo Vilhelm Gebelius, Fridhemsgatan 27, Stockholm, Sweden, S-11240

[22] Filed: Nov. 20, 1974

[21] Appl. No.: 525,636

[30] Foreign Application Priority Data
Nov. 30, 1973 Sweden............................. 7316255

[52] U.S. Cl. ............... 29/512; 29/523; 29/243.52; 85/68; 85/77; 227/9; 227/68; 285/382.4
[51] Int. Cl.². B21D 39/00; B23P 11/00; B25C 1/08
[58] Field of Search................ 29/512, 523, 243.52; 85/68, 77; 227/68, 9; 285/382.4

[56] References Cited
UNITED STATES PATENTS

| | | | |
|---|---|---|---|
| 1,159,576 | 11/1915 | Ensign | 227/68 X |
| 1,437,245 | 11/1922 | Hinchcliff | 227/68 X |
| 2,269,895 | 1/1942 | Foster et al. | 285/382.4 X |
| 2,355,439 | 8/1944 | Horton et al. | 29/512 UX |
| 2,432,949 | 12/1947 | Thorngren | 29/512 |
| 2,590,585 | 3/1952 | Temple | 227/9 |
| 2,830,485 | 4/1958 | Macy | 29/512 UX |

*Primary Examiner*—Charlie T. Moon
*Attorney, Agent, or Firm*—Holman & Stern

[57] ABSTRACT

The attachment of a tubular pipe connection means to the wall of a storage tank of similar structure in which an end portion of the pipe connection means attachable to the wall is provided with an inwardly inclined conical collar having at its free end portion an outwardly directed conical flange. A bar with a conically-shaped free end portion being insertable into the pipe connection means so that the free end portion thereof contacts the inside of the collar with a conical hole piercing member being attached to the free end portion of the bar in contact with the inside of the flange of the pipe connection means. The arrangement is such that when the hole piercing member together with the pipe connection means are moved axially through the wall of the tank, the conical collar and flange, via the conically shaped free end portion of the bar, are pressed outwardly and caused to bend and grip the edge of the hole formed in the wall by the piercing member.

11 Claims, 10 Drawing Figures

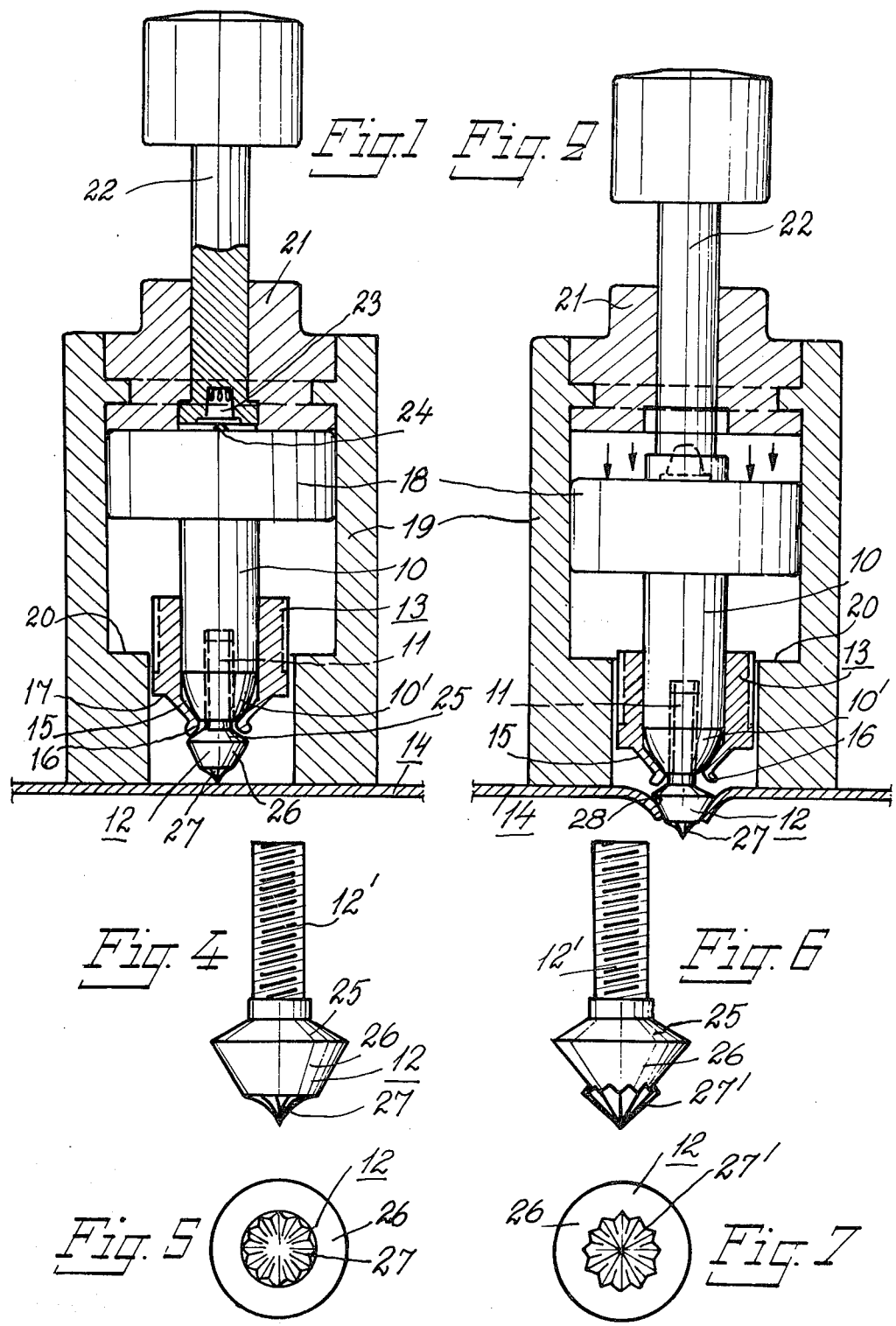

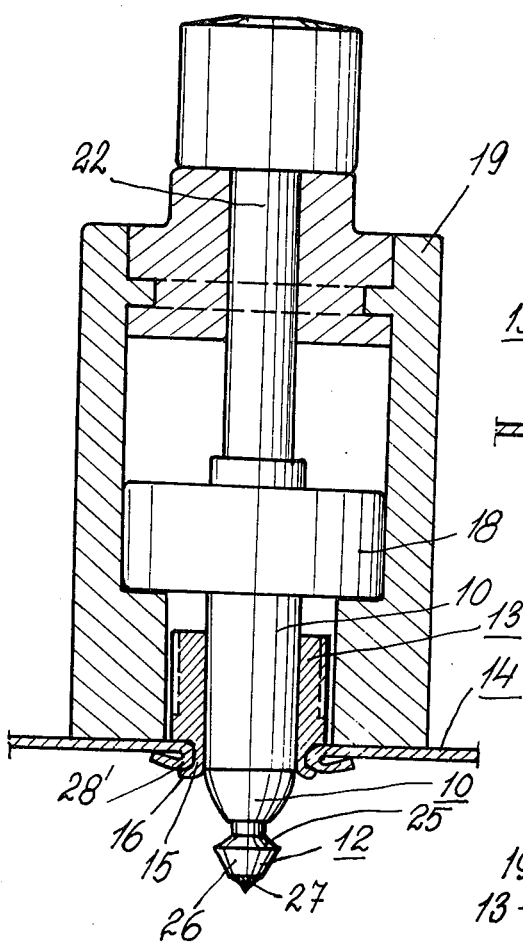
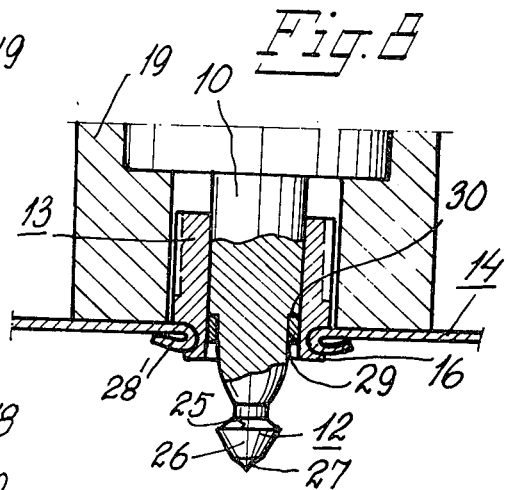
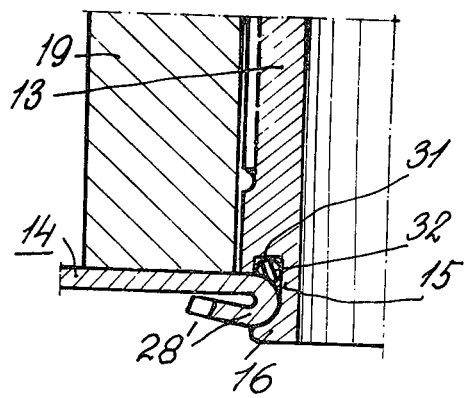
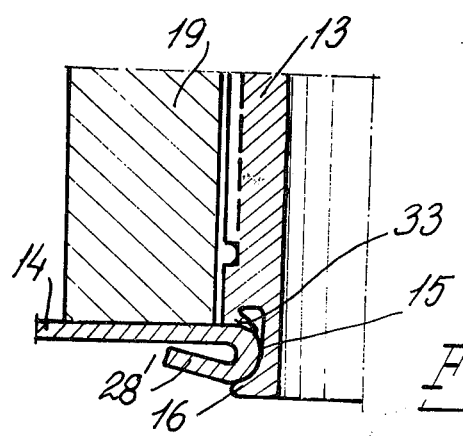

METHOD FOR THE ATTACHMENT OF TUBULAR PIPE CONNECTION MEANS TO A SHEET METAL WALL AND A DEVICE ACCORDING TO THE METHOD

BACKGROUND OF THE INVENTION

This invention relates to a method for the attachment of a tubular pipe connection means to a sheet metal wall, e.g. a storage tank or similar and to a device for the use of the method.

PRIOR ART

The attachment of pipe connection means to sheet metal storage tanks, in particular for the storage of oil products, has previously been complicated and time consuming, thus also involving large costs.

With regard to new oil storage tanks, holes have normally been cut through the sheet metal wall of the tank by means of drilling or cut by means of gas welding equipment, after which the pipe connection means have been welded or screwed to the sheet metal wall at the holes, which could have a relatively large diameter depending on the size of the pipe connection means.

If the oil storage tanks have previously been used, or, possibly are in use for the storage of oil products, it is not possible to use the welding method for cutting and attachment, in view of the risk of fire and explosion. It is also very difficult to attach pipe connection means by means of screw or bolt members, since it normally is necessary to arrange supporting washers and sealing gaskets on the inside walls of the tanks, which means that a person must work within the tank and in cooperation with someone working outside the tank. If various sizes of pipe connection means are to be attached to the tank, it is extremely difficult for the person within the tank to find the correct dimension of the supporting washers.

SUMMARY OF THE INVENTION

The method and device according to the present invention eliminate the above mentioned disadvantages completely, since pipe connection means can be fastly attached to the aforementioned sheet metal walls and without risks by only one person, working on the outside of the sheet metal wall or the tank.

The method according to the present invention is then mainly characterized in, that the end portion of the pipe connection means attachable to the sheet metal wall is arranged as an inwardly inclined and conical collar, having at the free end, an outwardly directed conical collar, and a slidable bar is inserted in the pipe connection means, having a conical shape at the free end portion brought in contact with the inside of the collar, after which a conical hole piercing member is attached to the free end portion of the bar and in contact with the inside of the collar, the hole piercing member, under the influence of an axially directed power towards the bar, is brought to move through the sheet metal wall and together with the pipe connection means, the collar shaped part and flange of which, by means of the conically shaped end portion of the bar, is pressed out and brought to bend and grip the edge portion of the hole created in the sheet metal wall, after which the bar with the hole piercing member is removed by a slidable movement in the opposite direction.

The method is further characterized in that the power influence for the axial movement of the bar towards the sheet metal walls is created by means of explosive power.

The device according to the method is mainly characterized in that the end portion of the pipe connection means attachable to the sheet metal walls is arranged with an inwardly inclined and conical collar, which, at the free end, is arranged with an outwardly directed conical flange member and that a slidable bar is inserted in the pipe connection means, being conically shaped at the free end portion and having contact with the inside of the collar, a conically hole piercing member being attachable to the free end portion of the bar and arranged in contact with the inside of the flange member, the hole piercing member being arranged to move through the sheet metal wall under the influence of an axially directed power together with the pipe connection means, the collar shaped part and flange member of which, by means of the conically shaped end portion of the bar, being arranged to be pressed outwardly to bend and grip the end portion of the hole created through the sheet metal wall.

The device is further characterized in that the axially directed power on the bar is an explosive power.

A further characteristic feature for the device according to the present invention is, that the pipe connection means, the bar and the hole piercing member are guided and movably arranged in a tubular member, having an open end portion adjacent to the sheet metal wall and the other end portion being arranged with a removable lid, through which a power initiating member directed toward the bar is slidably arranged.

The method and the device together with further modifications of the present invention will be more fully described below with reference to the enclosed drawings.

BRIEF DESCRIPTION OF THE DRAWINGS

FIG. 1 shows, partly in a longitudinal cross-section, a view of the pipe connection means and the device for accomplishment of the method when the device is brought to contact a sheet metal wall and before the operation of attachment for the pipe connection means has been started, FIG. 2 shows a view similar to FIG. 1 at the moment when the attachment of the pipe connection means has been started, FIG. 3 is a similar view at the moment when the pipe connection means has been attached to the sheet metal wall, FIG. 4 is a side view of an embodiment of the hole piercing member, FIG. 5 is an end view of the active part of the same hole piercing member, FIG. 6 is a side view of a second embodiment of the hole piercing member, FIG. 7 is an end view of the active part of the hole piercing member according to the second embodiment, FIG. 8 shows, partly in longitudinal cross-section, the pipe connection means attached to a sheet metal wall and the lower part of the device, according to a second modification, FIG. 9 shows, in a longitudinal cross-section and on a larger scale, a part of the device and the pipe connection means, which is arranged with a groove for a sealing member and FIG. 10 shows, in a similar view, a part of the device and pipe connection means, which is arranged with a sealing member acting towards the edge portion of the sheet metal.

DETAILED DESCRIPTION OF THE EMBODIMENTS

By reference numeral 10 is indicated an axially movable bar, having a lower end portion 10' rounded to a conical shape and arranged with an axially directed threaded channel 11, in which a threaded member 12' of a hole piercing member, generally indicated as 12, is attachable. Reference numeral 13 indicates generally a pipe connection means and 14 a sheet metal wall through which a hole is pierced for the attachment of the pipe connection means 13.

The bar 10 is of a circular cross-section and arranged to slide guided by the inside wall of the pipe connection means 13. The pipe connection means 13 is, at the lower end portion, arranged with an inwardly inclined and conical collar 15, having the free end portion arranged with an outwardly inclined conical flange member 16. The pipe connection means 13 is, at the connection to the collar 15, arranged with a flange edge 17 contactable with the sheet metal wall 14. The bar 10 is, at the opposed end portion, provided with a piston 18, which is sealingly movably in an embracing tubular member or cylinder 19, in which the pipe connection means 13 also is guided and movable. The inside of the tubular member 19 has a contact flange member 20 for the piston 18 and, by means of a bayonet lock or the like, a detachably fixed lid 21, through which a channel is centrally formed, in which is movably mounted a power initiating member 22, having a means for attachment of an explosive cartridge 23, which can be caused to explode when a pointed part 24 of the piston 18 penetrates the cartridge 23.

The hole piercing member 12 is of circular cross-section and provided with two opposed conical surfaces 25 and 26 and a pointed part 27, with the part 27 being starshaped and curved. As shown in FIGS. 6 and 7, the pointed part 27, 27' respectively is shaped to a cutting member.

The method and device according to the present invention is performed, and operates, respectively as follows: The tubular pipe connection means 13 is inserted from the conically curved end portion 10' of the bar 10 in such a way that the collar 15 makes contact as shown in FIG. 1, after which the hole piercing member 12 is attached to the threaded channel 11, with the conical surface 25 of the hole piercing member 12 making contact with the inside of the conical flange member 16 of the collar 15, which is arranged inside the largest cross-section of the hole piercing member 12.

When the tubular member 19 is moved to contact the outer surface of the sheet metal wall 14 with the downwardly directed end portion, the pointed part 27, 27' of the hole piercing member 12 makes contact with the aforementioned surface, with the bar 10 and with the piston 18 being moved to a fixed end position from the aforementioned sheet metal surface.

When a hole is to be pierced through the sheet metal wall 14, the initiating member 22 is moved, manually or by means of an impact tool towards the piston 18, thus forcing the part 24 to penetrate the explosive cartridge 23 and explode the same. A rapidly acting pressure is thus created on the upper side of the piston 18, as shown in FIG. 2, thus forcing the hole piercing member 12 to be pressed through the sheet metal wall 14 under the influence of great power, with edge portion 28' of the created hole 28 being bent down and, by means of the flange 16 of the collar 15, pressed into contact with the inside of the sheet metal wall 14, as shown in FIG. 3, simultaneously as the conical wall of the collar 15 is pressed outwardly under the influence of the conically and curved end portion 10' of the bar 10. The collar 15 and the flange member 16 together with the flange edge portion 17 in the pipe connection means 13 are thereby forced to grip the edge portion 28' of the hole 28, thus attaching the pipe connection means 13 in a fixed relationship to the sheet metal wall 14. The bar 10 can, adjacent to the end portion 10', be slightly conically shaped downwardly, in order to faciliate the return movement of the bar 10 with the hole piercing member 12 through the pipe connection means 13, after completed attachment to the sheet metal wall 14.

In cases in which the size of the pipe connection means 13 is rather considerable and the area of the hole 28 is relatively large, the sheet metal material is preferably cut to a star shaped configuration when the edge portion 28' is folded. In order to accomplish this in an efficient manner, the pointed part 27, 27' of the hole piercing member 12 can be arranged with a star-shaped cutting or slitting member, as shown in FIGS. 6 and 7. If the pipe connection means 13 is manufactured from a synthetic plastic material or any other similar and relatively soft material, a ring-shaped steel member 29 is preferably fixed to the inside of the pipe connection means 13, in a position corresponding to the edge portion 28' of the hole 28, as shown in FIG. 8. In this case, the bar 10 is arranged with a supporting flange member 30, against which the ring-shaped steel member 29 is in contact during the piercing and attachment of the pipe connection means 13 to the sheet metal wall 14.

In order to accomplish an efficient and long lasting sealing effect between the pipe connection means 13 and the edge portion 28' of the hole 28, the pipe connection means 13 can be provided with a circular groove 31, in which a gasket member of elastical material 32, e.g. rubber, can be inserted as shown in FIG. 9.

As shown in FIG. 10, the pipe connection means 13 can be arranged with a sealing flange member 33, arranged to take up a spring-acting contact with the edge portion 28' of the hole 28.

When the pipe connection means 13 has been attached to the sheet metal wall 14, a tubular element can be attached to the pipe connection means 13 in a previously known way.

The power influence on the bar 10 necessary for accomplishment of the method, can be created by means of impact power only, particularly when the material of the sheet metal wall 14 is relatively soft, e.g. a light metal alloy or similar materials. If the material of the sheet metal wall 14 is hard, e.g. steel, the power influence is preferably created by means of explosive power.

The method and device according to the present invention makes it possible to attach pipe connection means to sheet metal walls speedily and effectively, using a minimum of man power. Large savings in labor costs are thus achieved in comparison with what has previously been possible.

The device according to the method can be varied and modified in a number of ways within the framework of the invention and the following claims.

I claim:

1. A method of attaching a tubular pipe connection means to a sheet metal wall, such as a storage tank or similar structure, in which an end portion of the pipe connection means attachable to the sheet metal wall is provided with an inwardly inclined conical collar having at its free end portion an outwardly directed conical flange member; comprising the steps of providing a bar with a conically-shaped free end portion; inserting the movable bar into the pipe connection means so that the free end portion thereof contacts the inside of the collar of the pipe connection means; attaching a conical hole piercing member to the free end portion of the bar in contact with the inside of the flange member; moving the hole piercing member together with the pipe connection means axially through the sheet metal wall so that the conical collar and flange member, by means of the conically-shaped free end portion of the bar are pressed outwardly and caused to bend and grip the edge portion of the hole formed through the sheet metal wall by means of the piercing member; and sliding the bar in the opposite direction for removing together with the hole piercing member.

2. The method according to claim 1 comprising directing an explosive force for moving the bar and piercing member on the bar axially towards and through the sheet metal wall.

3. In a device for the attachment of a tubular pipe connection means to a sheet metal wall, such as a storage tank or similar structure, in which an end portion of the pipe connection means attachable to the sheet metal wall is provided with an inwardly inclined conical collar having at the free end portion an outwardly inclined, conical flange member; a bar slidably inserted in the pipe connection, the bar having a conically-shaped free end portion arranged to make contact with the inside of the collar; a conically-shaped hole piercing member insertable into the free end portion of the bar and arranged to make contact with the inside of the flange member; and power means to move the hole piercing member axially through the sheet metal wall and to also move the bar and the pipe connection means in contact therewith, the collar and flange member of said pipe connection means being pressed outwardly by means of the conically-shaped free end portion of the bar to bend and grip the edge portion in the hole formed through the sheet metal wall.

4. The device according to claim 3 in which the power means is defined by an explosive and means to detonate the explosive.

5. The device according to claim 3, including a tubular member having one open end portion adjacent to the sheet metal wall and an opposed end portion, a removable lid for the opposed end portion, the bar and hole piercing member being guided and movably arranged in the tubular member, the power means including a power initiating member directed towards the bar and slidably arranged in the removable lid.

6. The device according to claim 5 in which the bar, at the end portion directed towards the lid, is provided with a piston member, guidingly and sealingly mounted against the inside of the tubular member.

7. The device according to claim 6 in which the power means is an explosive, and the power initiating member is provided with means to detonate the explosive when the initiating member is moved.

8. The device according to claim 5 in which the hole piercing member is provided with a pointed curved curface at the end portion directed towards the sheet metal wall.

9. The device according to claim 8 in which the pointed curved surface is star-shaped.

10. The device according to claim 5 in which the bar is provided with a circular recess at the end portion directed towards the hole piercing member, and a steel ring member insertable in the recess for the support of the inside of the pipe connection means.

11. The device according to claim 5 in which the pipe connection means adjacent to the collar is provided with a sealing member acting against the edge of the hole.

* * * * *